E. FRANKE.
VEGETABLE MASHING MACHINE.
APPLICATION FILED AUG. 25, 1913.
1,158,198.
Patented Oct. 26, 1915.
3 SHEETS—SHEET 2.
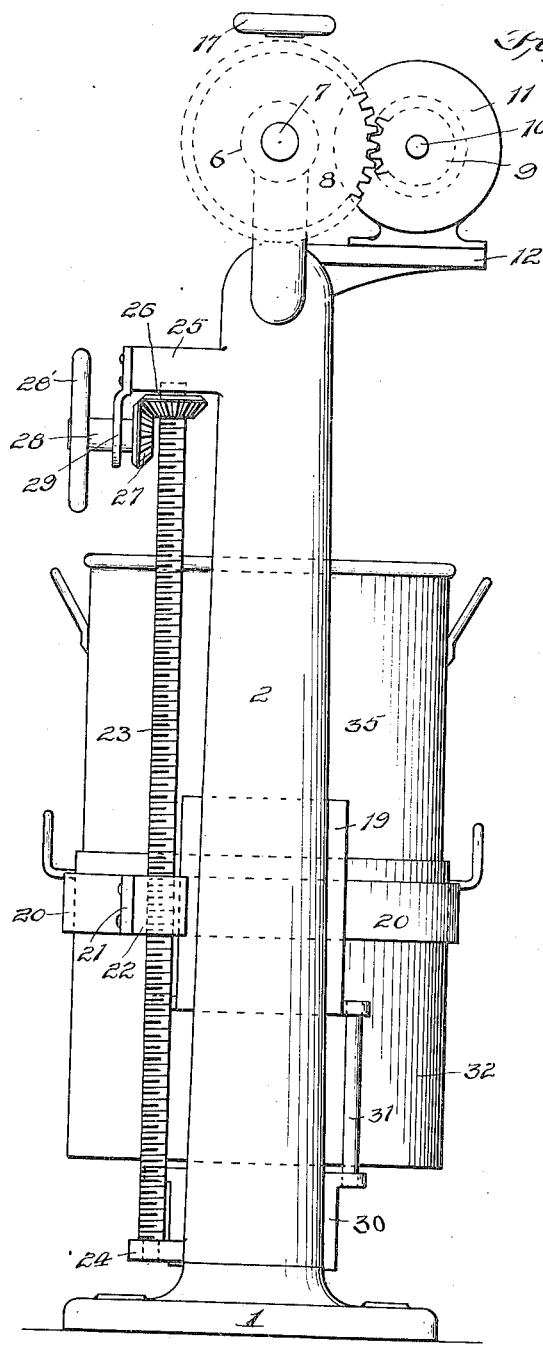
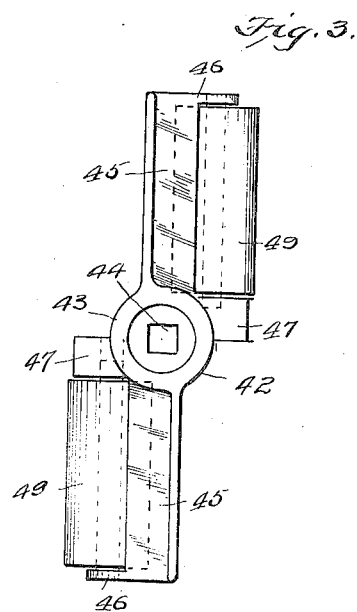
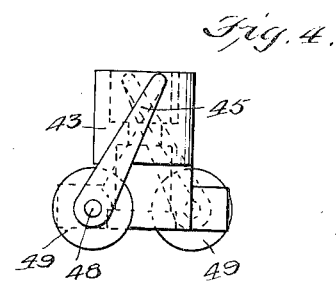
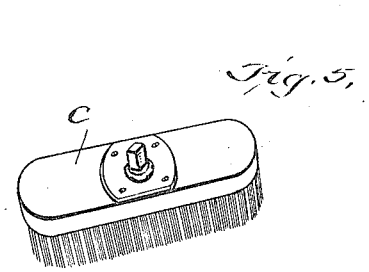
WITNESSES:
Fred J. Aaron
James Jones
INVENTOR:
Edwin Franke.
BY
Olwin M. Olson
ATTORNEY E. FRANKE.
VEGETABLE MASHING MACHINE.
APPLICATION FILED AUG. 25, 1913.
1,158,198.
Patented Oct. 26, 1915.
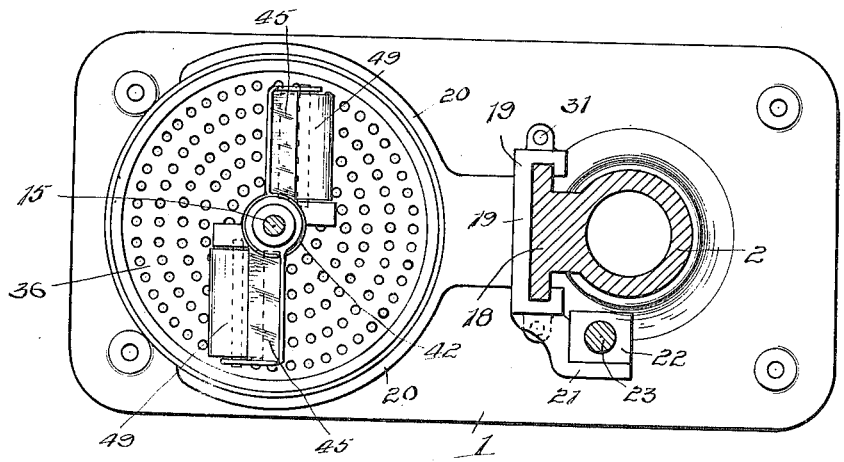
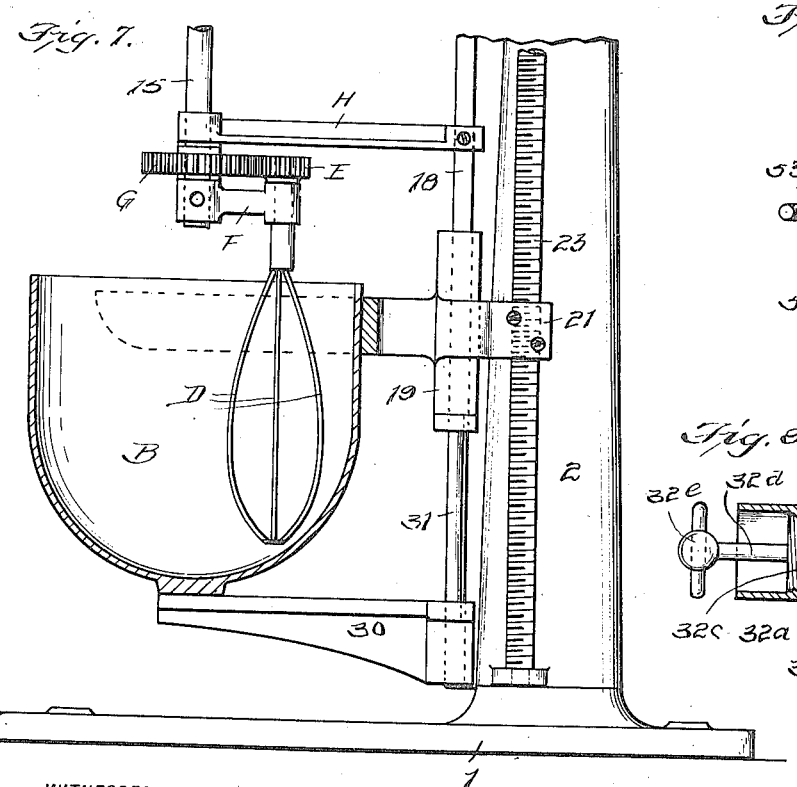
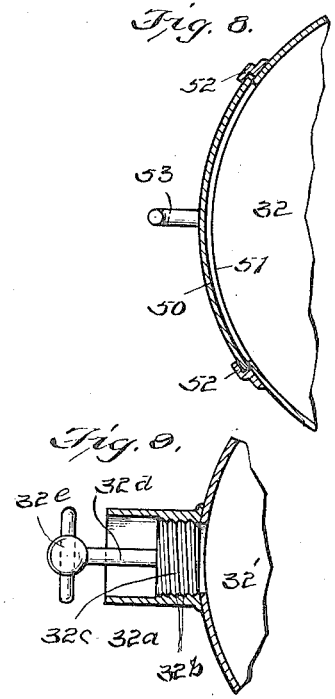
WITNESSES:
INVENTOR:
Edwin Franke.
BY
ATTORNEY

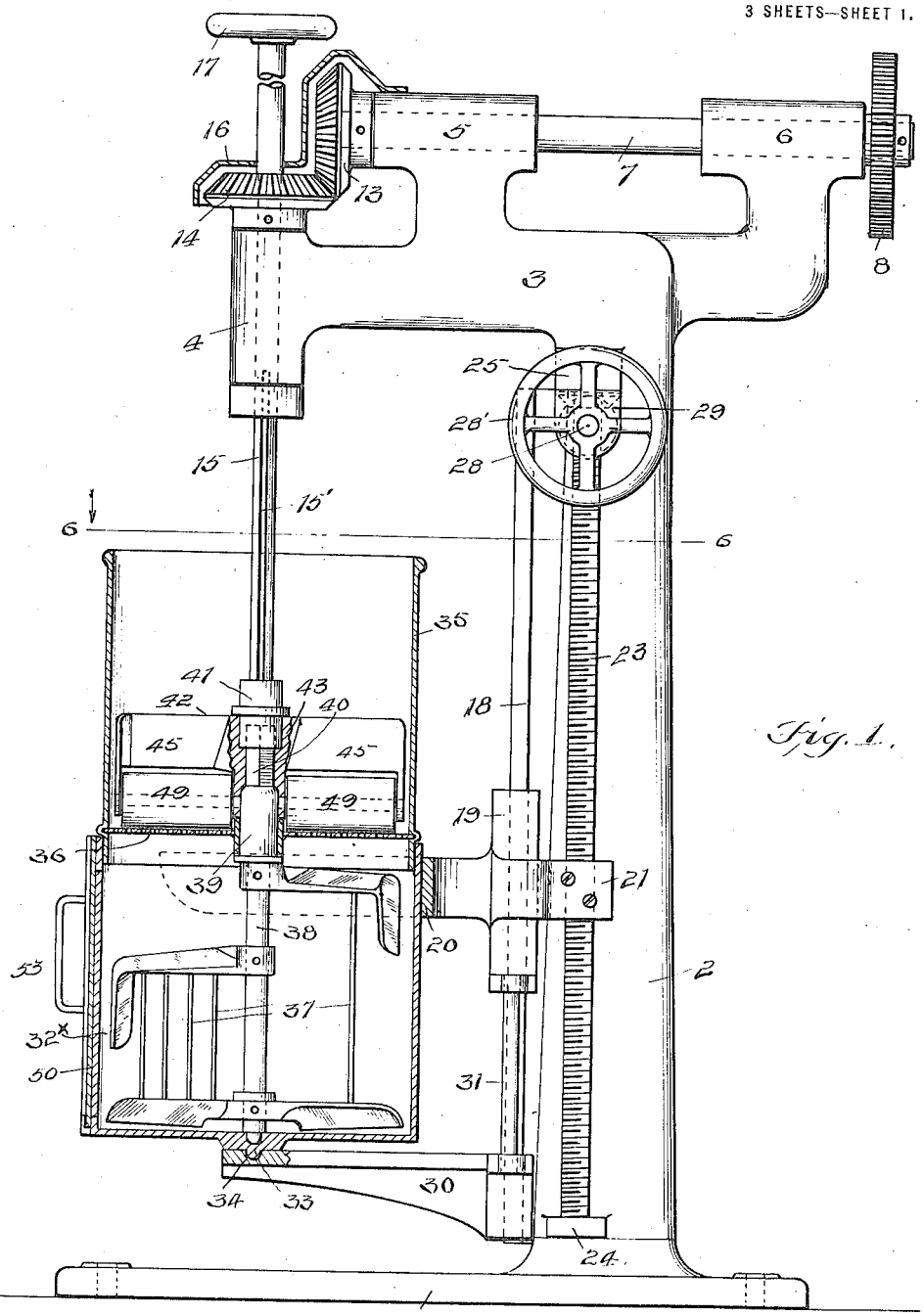

UNITED STATES PATENT OFFICE.

EDWIN FRANKE, OF CHICAGO, ILLINOIS.

VEGETABLE-MASHING MACHINE.

1,158,198.  Specification of Letters Patent.  Patented Oct. 26, 1915.

Application filed August 25, 1913. Serial No. 786,534.

*To all whom it may concern:*

Be it known that I, EDWIN FRANKE, a citizen of the United States, residing in Chicago, in the county of Cook and State of Illinois, have invented a new and useful Vegetable-Mashing Machine, of which the following is a specification.

My invention relates to improvements in machines for comminuting, flocculating and straining cooked food, and particularly to machines of the class which are utilized chiefly to mash potatoes and other vegetables, and strain soups and the like.

The objects of my invention are to provide for quick and convenient dismemberment and assembling of the food holding vessels and their food crushing parts, to so arrange said food holding vessels and their parts that they may be utilized for several different purposes and employed in connection with different kinds of food, and to enable the food holding vessels to be manually adjusted in their supporting frame without interfering with the operation of the food crushers. This I accomplish by the means hereinafter fully set forth, and as particularly pointed out in the claims.

In the drawings: Figure 1 represents a side elevation of my improved machine with a vertical central section through the food vessels. Fig. 2 represents a rear elevation of my improved machine. Fig. 3 is a detached detail top view of the rotary masher. Fig. 4 is a detachable detail end view of the rotary masher. Fig. 5 is a detached perspective view of the rotary brush. Fig. 6 is a horizontal section through the machine taken on a plane intersecting the upper and lower food vessels. Fig. 7 is a fragmentary side elevation of the lower portion of the machine, illustrating the beater attachment therefor. Fig. 8 is an enlarged fragmentary horizontal section through one of the food vessels to illustrate the sliding door construction. Fig. 9 is an enlarged fragmentary horizontal section through one of the food vessels illustrating the spout attachment thereto.

Referring to the drawings, 1 represents the base of the machine which is, preferably, a low flat horizontal plate that rests directly upon the ground or floor, and I prefer to rigidly mount a vertical standard 2, in said base, the upper portion 3 of which is of an angular form and carries bearings 5 and 6 in which a horizontal driving shaft 7 is journaled.

An operating means 11, preferably an electric motor, is supported upon a shelf 12, extending laterally from the standard and has its shaft 10 connected to the horizontal shaft 7 by intermeshing gear wheels 8 and 9 mounted on the respective shafts. At one end of the upper portion 3 of the standard, I prefer to locate a vertical bearing 4 in which the upper terminal portion of a vertical shaft 15 is journaled, and to mount on the upper end of said shaft 15 a bevel-gear 14 which meshes with a corresponding bevel-gear 13 on the end of the horizontal shaft 7 opposite gear-wheel 8. I prefer to inclose the meshing bevel-gears within a suitable housing 16, and to provide the upper end of shaft 15 with a hand-wheel 17, by which said shaft may be manually rotated or elevated vertically through the bearing 4 and bevel-gear wheel 14. To prevent rotation of the gear-wheel 14 independently of shaft 15 without interfering with the vertical adjustment of said shaft, I form a longitudinal groove 15' in the shaft in which an inwardly extending projection on the gear-wheel 14 slidably extends.

At one side of the vertical standard, I form a guideway 18 on which a slide 19 is adjustably fitted, as shown in Fig. 6, and from said slide I extend a curved or forked support 20 in which a lower food containing vessel 32 is removably arranged. An upper food containing vessel 35 has its bottom edge flanged so as to fit within the mouth of the lower vessel and is, preferably, provided with a perforated bottom 36.

The slide is provided with an angular arm 21 which carries a block 22 having a screw-threaded vertical opening and a screw-bar 23 is mounted on one side of the standard with its lower end journaled in a lateral bearing lug 24 extending from the standard, and its upper end correspondingly journaled in an upper bearing lug 25, likewise extending from the standard. The screw-bar 23, I prefer to rotate manually, and for this purpose a bevel-gear 26 is mounted on the upper end of said bar which meshes with a corresponding bevel-gear wheel 27 on the inner end of a short horizontal shaft 28 suitably rotatably mounted in a depending plate 29 attached to the outer extremity of the upper bearing lug 25 and carrying a hand-wheel 28' at its outer end, as shown in Fig. 2.

A lower horizontal supporting bar 30, which is slidably mounted on the guideway 18 below the slide 19 and is rigidly supported by said slide by a pair of parallel vertical connecting-rods 31, projects beneath the lower food containing vessel 32 and has a concavity 34 in which a center depending projection 33 journals, as shown in Fig. 1.

A rotary chopping and cutting device is, preferably, removably located within the lower food containing vessel and comprises a central vertical shaft 38 and a series of angular laterally disposed cutting arms 32× secured to said shaft at suitable intervals, as shown in Fig. 1, some of said cutting arms being connected to each other at intermediate points by vertical connecting bars 37.

I provide a central vertical opening in the bottom of the upper vessel through which the upper projecting end 39 of shaft 38 is removably fitted and journaled; said shaft end having a square or other non-circular head 40 extending within the upper vessel above the bottom thereof.

I prefer to removably arrange a rotary comminuting and mashing device within the upper vessel which comprises a central portion 43 having a central bore 44 which in part is reduced in size and made square, as shown in Fig. 3, oppositely extending radial cutting arms 45 the cutting faces of which extend obliquely and are provided with lateral ears 46 and 47 extending from the respective ends of said arms and rollers 49 located between the ears and having the ends of their supporting shaft 48 journaled in said ears, as shown in Fig. 4, said rollers being arranged below the cutting arms. A flanged collar 41 is fastened on the lower end of shaft 15, the lower depending portion of which is provided with a bore of square outline, and when the vessel and rotary devices are properly assembled the head 40 of shaft 38 extends through bore 44 of the mashing device in the upper vessel and into the bore of collar 41, thereby operatively and removably connecting the upper and lower devices to each other and the vertical shaft 15 for simultaneous rotation, as shown in Fig. 1.

In Fig. 5, I have shown, in perspective, a brush C which is adapted to be removably arranged in the upper vessel in place of the roller mashing device when soups or similar thin food mixtures are placed in the vessels to be comminuted and strained. When soups are mixed or strained, I prefer to provide the lower vessel with a suitable spout 32ª through which it can be conveniently removed. The opening through said spout is normally closed by a screw-plug 32ᶜ attached to the inner end of a rod 32ᵈ having a suitable turning handle 32ᵉ, as shown in Fig. 9.

In the form shown in Figs. 1 and 8, I have provided a slide-door 50 in the lower vessel 32 which has an inner lining 51 and an outer handle 53, and is slidably and removably mounted in parallel vertical guideways 52 arranged on opposite sides of an opening in said lower vessel.

When it is desired to utilize the machine for mixing cake or pastry batter, a rounded bottom vessel B is, preferably, arranged in the machine-frame in place of the usual lower food vessel, and a rotary whipper D is journaled in an arm F and carries a pinion E which meshes with a gear-wheel G on the shaft 15. In this instance, the lower portion of the shaft 15 is additionally supported from the standard by a lower horizontal arm H, which also carries the arm F, as shown in Fig. 7.

What I claim as new is:

1. In a machine of the class described, a machine-frame having a base and a vertical standard extending therefrom, a vessel support adjustably mounted on said standard, a food containing vessel removably supported from said vessel support, a rotary food comminuting device removably located within the vessel and having a central sleeve, and a rotary shaft having its lower extremity engaging in the sleeve of the food comminuting device; said shaft being vertically adjustable to permit dismemberment or assembling of the vessel and its comminuting device.

2. In a machine of the class described, a machine frame having a base and a vertical standard extending therefrom, a vessel support adjustably mounted on said standard, a food containing vessel removably supported from said vessel-support, a rotary food comminuting device removably located within the vessel, and a vertically arranged rotary shaft constructed to have operative connection with the rotary food comminuting device; said food comminuting device comprising a central sleeve, oppositely extending blades and rollers journaled beneath and in parallel longitudinal arrangement with said blades.

3. In a machine of the class described, a machine frame having a base and a vertical standard extending therefrom, a vessel support adjustably mounted on said standard, a food containing vessel removably supported from said vessel-support, a rotary food comminuting device removably located within the vessel, and a vertically arranged rotary shaft constructed to have operative connection with the rotary food comminuting device; said food comminuting device comprising a central sleeve, oppositely extending obliquely disposed blades and rollers journaled beneath and in parallel longitudinal arrangement with said blades.

4. In a machine of the class described, a machine-frame having a base and a vertical standard extending therefrom, a vessel-support, a lower food containing vessel removably supported from said support, an upper food containing vessel removably mounted upon said lower food containing vessel, a rotary food comminuting device in the lower vessel, a second rotary food comminuting device in the upper vessel; said food comminuting devices having interlocking central sleeves and a rotary vertical shaft, having its lower extremity projecting into and engaging said sleeves, said shaft being vertically adjustable to permit dismemberment or assembling of the vessels and their comminuting devices.

5. In a machine of the class described, a machine frame having a base and a vertical standard extending therefrom, a vessel-support, a lower food containing vessel removably supported from said support, an upper food containing vessel removably mounted upon said lower food containing vessel, a rotary food comminuting device in the lower vessel, a second rotary food comminuting device in the upper vessel; said food comminuting devices having central sleeves and one of said sleeves having a projection which fits within the other sleeves and locks said sleeves against independent rotation, and a rotary vertical shaft having its lower extremity removably fitting in one of said sleeves to lock said shaft to said sleeve against independent rotation; said shaft being also vertically adjustable to permit dismounting the machine.

6. In a machine of the class described, a machine frame having a base and a vertical standard extending therefrom, a vessel-support, a lower food containing vessel removably supported from said support, an upper food containing vessel removably mounted upon said lower food containing vessel, a rotary food comminuting device in the lower vessel, a second rotary food comminuting device in the upper vessel; said food comminuting devices having central sleeves and one of said sleeves having a reduced projection that detachably fits and unrotatably locks in the other sleeve, and a longitudinally adjustable rotary vertical shaft having its lower extremity removably fitted in one of said sleeves, said sleeve being locked to said shaft against independent rotation when connected thereto.

In testimony whereof I have affixed my signature in the presence of two witnesses.

EDWIN FRANKE.

Witnesses:
OLIVER M. OLSON,
JAMES M. DEVANEY.